United States Patent
Sasaki

(10) Patent No.: US 9,098,949 B2
(45) Date of Patent: Aug. 4, 2015

(54) IMAGE PROCESSING APPARATUS, IMAGE PROCESSING METHOD, AND COMPUTER-READABLE MEDIUM

(71) Applicant: FUJI XEROX CO., LTD, Minato-ku, Tokyo (JP)

(72) Inventor: Makoto Sasaki, Kanagawa (JP)

(73) Assignee: FUJI XEROX CO., LTD, Tokyo (JP)

( * ) Notice: Subject to any disclaimer, the term of this patent is extended or adjusted under 35 U.S.C. 154(b) by 162 days.

(21) Appl. No.: 13/971,073

(22) Filed: Aug. 20, 2013

(65) Prior Publication Data

US 2014/0198991 A1  Jul. 17, 2014

(30) Foreign Application Priority Data

Jan. 17, 2013 (JP) ................................. 2013-006130

(51) Int. Cl.
*G06T 11/60* (2006.01)
(52) U.S. Cl.
CPC ..................................... *G06T 11/60* (2013.01)
(58) Field of Classification Search
CPC ....... G06T 11/60; B25J 9/163; G05B 13/0265
See application file for complete search history.

(56) References Cited

U.S. PATENT DOCUMENTS

| | | | |
|---|---|---|---|
| 5,875,265 A | 2/1999 | Kasao | |
| 7,016,075 B1 | 3/2006 | Tsukada | |
| 7,711,145 B2 * | 5/2010 | Gallagher | 382/103 |
| 8,811,762 B2 * | 8/2014 | Sasai et al. | 382/239 |
| 2003/0204333 A1 * | 10/2003 | Asatsu et al. | 702/35 |
| 2008/0052135 A1 * | 2/2008 | Ziade et al. | 705/4 |
| 2008/0075338 A1 * | 3/2008 | Muramatsu et al. | 382/118 |
| 2010/0094768 A1 * | 4/2010 | Miltonberger | 705/325 |
| 2013/0345865 A1 * | 12/2013 | Iba et al. | 700/250 |
| 2014/0094940 A1 * | 4/2014 | Ghassemzadeh et al. | 700/91 |
| 2014/0170619 A1 * | 6/2014 | Ahn et al. | 434/236 |
| 2014/0189122 A1 * | 7/2014 | Beerse et al. | 709/226 |

FOREIGN PATENT DOCUMENTS

| | | |
|---|---|---|
| JP | 09-016797 A | 1/1997 |
| JP | 2001-092956 A | 4/2001 |
| JP | 2007-208673 A | 8/2007 |
| JP | 2011-118906 A | 6/2011 |

* cited by examiner

*Primary Examiner* — Jingge Wu
(74) *Attorney, Agent, or Firm* — Sughrue Mion, PLLC

(57) ABSTRACT

An image processing apparatus includes an accepting unit, a calculation unit, a coefficient setting unit, and a processor. The accepting unit accepts a set of feeling expressions representing texture factors. The calculation unit calculates posterior probabilities which are event probabilities for events by using likelihoods and prior probabilities. The event probabilities correspond to the set of feeling expressions. The likelihoods indicate probabilities that each of the feeling expressions is selected for an event selected from the events. The prior probabilities indicate probabilities that each of the events is selected. The coefficient setting unit sets coefficients for image processing from the posterior probabilities. The processor performs processing on a given image in accordance with the coefficients which have been set.

14 Claims, 11 Drawing Sheets

FIG. 3

| CHOICES | FLAG | |
|---|---|---|
| ☑ SOFTNESS, FLUFFINESS | 1 | (D1) |
| ☐ HARDNESS | 0 | (D2) |
| ☑ COLOR SHADE, VIVIDNESS | 1 | (D3) |
| ☐ CLEARNESS, SHARPNESS | 0 | (D4) |
| ☐ DETAIL | 0 | (D5) |
| ☑ SHAPE OF HIGH-PRIORITY SUBJECT | 1 | (D6) |

FIG. 4

| FEELING EXPRESSION | MEANING |
|---|---|
| D1 | SOFTNESS, FLUFFINESS |
| D2 | HARDNESS |
| D3 | COLOR SHADE, VIVIDNESS |
| D4 | CLEARNESS, SHARPNESS |
| D5 | DETAIL |
| D6 | SHAPE OF HIGH-PRIORITY SUBJECT |

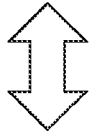 ESTIMATE RELATIONSHIP STATISTICALLY

| PROCESSING MODE | INTENTION (IMAGE PROCESSING GOAL) |
|---|---|
| H1 | PRIORITY ON BALANCE OF SHAPE AND TEXTURE |
| H2 | PRIORITY ON COLOR SHADE AND SATURATION TEXTURE |
| H3 | PRIORITY ON HIGH RESOLUTION TEXTURE |

FIG. 5A

| FEELING EXPRESSION | H1 | H2 | H3 |
|---|---|---|---|
| D1 | 0.5 | 0.4 | 0.2 |
| D2 | 0.5 | 0.4 | 0.7 |
| D3 | 0.4 | 0.8 | 0.3 |
| D4 | 0.4 | 0.3 | 0.6 |
| D5 | 0.2 | 0.4 | 0.9 |
| D6 | 0.8 | 0.4 | 0.5 |

FIG. 5B

|  | H1 | H2 | H3 |
|---|---|---|---|
| PRIOR PROBABILITY | 0.3 | 0.3 | 0.4 |

FIG. 6

| PROCESSING MODE | COEFFICIENT FOR IMAGE PROCESSING | | | | | | |
|---|---|---|---|---|---|---|---|
| H1 | $t_{11}$ | $t_{12}$ | $t_{13}$ | ... | $t_{1(n-2)}$ | $t_{1(n-1)}$ | $t_{1n}$ |
| H2 | $t_{21}$ | $t_{22}$ | $t_{23}$ | ... | $t_{2(n-2)}$ | $t_{2(n-1)}$ | $t_{2n}$ |
| H3 | $t_{31}$ | $t_{32}$ | $t_{33}$ | ... | $t_{3(n-2)}$ | $t_{3(n-1)}$ | $t_{3n}$ |
| | SATURATION EMPHASIS | | BAND SELECTION | | ... | FREQUENCY EMPHASIS | |

FIG. 7

| WEIGHT | PROCESSING MODE | COEFFICIENT FOR IMAGE PROCESSING | | | | | | |
|---|---|---|---|---|---|---|---|---|
| w1 | H1 | $t_{11}$ | $t_{12}$ | $t_{13}$ | ... | $t_{1(n-2)}$ | $t_{1(n-1)}$ | $t_{1n}$ |
| w2 | H2 | $t_{21}$ | $t_{22}$ | $t_{23}$ | ... | $t_{2(n-2)}$ | $t_{2(n-1)}$ | $t_{2n}$ |
| w3 | H3 | $t_{31}$ | $t_{32}$ | $t_{33}$ | ... | $t_{3(n-2)}$ | $t_{3(n-1)}$ | $t_{3n}$ |

FIG. 10A

| FOR ALL GENERATIONS | FEELING EXPRESSION | H1 | H2 | H3 |
| FOR SENIOR GENERATION | FEELING EXPRESSION | H1 | H2 | H3 |
| FOR YOUNG GENERATION | FEELING EXPRESSION | H1 | H2 | H3 |
|---|---|---|---|---|
| | D1 | 0.5 | 0.4 | 0.2 |
| | D2 | 0.5 | 0.4 | 0.7 |
| | D3 | 0.4 | 0.8 | 0.3 |
| | D4 | 0.4 | 0.3 | 0.6 |
| | D5 | 0.2 | 0.4 | 0.9 |
| | D6 | 0.8 | 0.4 | 0.5 |

FIG. 10B

| FOR ALL GENERATIONS | | H1 | H2 | H3 |
| FOR SENIOR GENERATION | | H1 | H2 | H3 |
| FOR YOUNG GENERATION | | H1 | H2 | H3 |
|---|---|---|---|---|
| | PRIOR PROBABILITY | 0.3 | 0.3 | 0.4 |

IMAGE PROCESSING APPARATUS, IMAGE PROCESSING METHOD, AND COMPUTER-READABLE MEDIUM

CROSS-REFERENCE TO RELATED APPLICATIONS

This application is based on and claims priority under 35 USC 119 From Japanese Patent Application No. 2013-006130 filed Jan. 17, 2013.

BACKGROUND (i) Technical Field

The present invention relates to an image processing apparatus, an image processing method, and a computer-readable medium.

(ii) Related Art

Captured color images show various types of scenes, such as scenes including persons, goods, and food, and there are many known image processing techniques for processing such images. Typical users adjust image quality by using such image processing techniques. In the field of desk top publishing (DTP), for example, designers perform retouching to adjust image quality.

Some of the image processing apparatuses for adjusting image quality have a large number of types of graphical user interface (GUI) components to achieve usability. For example, a screen for setting various adjustment items is presented to a user, and the user by himself/herself sets the adjustment items. To obtain desired image quality in such an apparatus, the user needs to know certain techniques and have technical knowledge in order to make any necessary adjustments.

In another exemplary image processing apparatus, a processing mode is selected from processing modes, and adjustment is performed in accordance with the setting corresponding to the selected processing mode. In this case, a user selects any one of the processing modes. The user determines what type of processing is to be performed in each processing mode or what type of result is to be obtained from the processing in each processing mode, from the names or the like of the processing modes.

People use words to express their intentions. Needless to say, when a user selects a processing mode, it is also required that the user's intention match the term attached to the processing mode.

SUMMARY

According to one aspect of the present invention, there is provided an image processing apparatus including an accepting unit, a calculation unit, a coefficient setting unit, and a processor. The accepting unit accepts a set of feeling expressions representing texture factors. The calculation unit calculates posterior probabilities which are event probabilities for events by using likelihoods and prior probabilities. The event probabilities correspond to the set of feeling expressions. The likelihoods indicate probabilities that each of the feeling expressions is selected for an event selected from the events. The prior probabilities indicate probabilities that each of the events is selected. The coefficient setting unit sets coefficients for image processing from the posterior probabilities. The processor performs processing on a given image in accordance with the coefficients which have been set.

BRIEF DESCRIPTION OF THE DRAWINGS

Exemplary embodiments of the present invention will be described in detail based on the following figures, wherein:

FIG. 3 is a diagram for describing exemplary information indicating a set of feeling expressions;

FIG. 4 is a diagram for describing an example of feeling expressions and processing modes;

FIGS. 5A and 5B are diagrams for describing an example of likelihoods and prior probabilities;

FIG. 6 is a diagram for describing an example of processing modes and coefficients for image processing;

FIG. 7 is a diagram for describing an example of weights, processing modes, and coefficients for image processing;

FIGS. 10A and 10B are diagrams for describing an example of sets of likelihoods and sets of prior probabilities prepared for respective populations.

DETAILED DESCRIPTION

Figure 1:
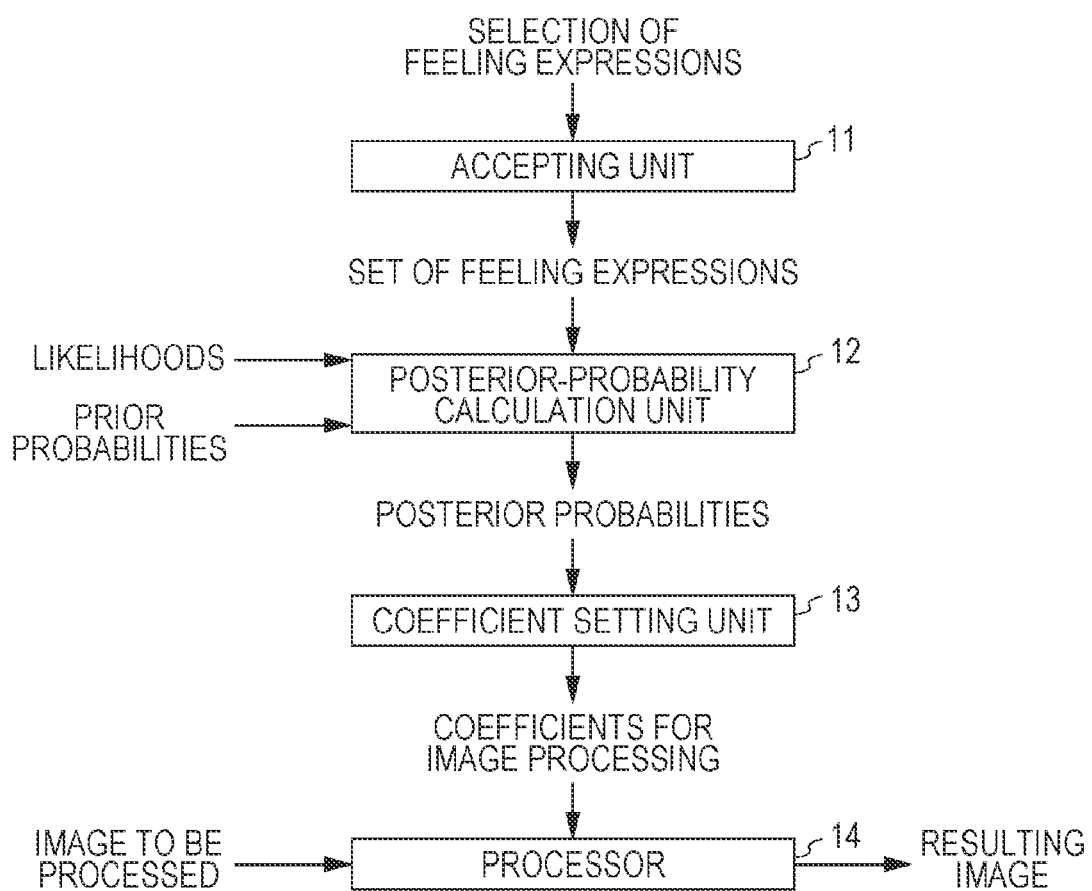
FIG. 1 is a diagram illustrating a configuration of a first exemplary embodiment of the present invention.

FIG. 1 is a diagram illustrating a configuration of a first exemplary embodiment of the present invention. FIG. 1 illustrates an accepting unit 11, a posterior-probability calculation unit 12, a coefficient setting unit 13, and a processor 14. The accepting unit 11 accepts a set of feeling expressions indicating texture factors selected by a user. For example, the accepting unit 11 presents a list of predetermined feeling expressions to a user through a GUI or the like, and accepts selection of feeling expressions which is performed by the user. According to the user's intention, such as "what the result is to be" or "what is to be given high priority", for an image that is to be modified, the user simply selects feeling expressions which the user regards as being suitable for representation of the user's intention. More than one feeling expression may be selected. Needless to say, a single feeling expression may be selected. A feeling expression may be constituted by an adjective, an adverb, a noun, or text using these, which represent a purpose of reproducing an image or characteristics of the scene or an object in the image.

The posterior-probability calculation unit 12 uses likelihoods indicating probabilities that each of the feeling expressions is selected for an event selected from events, and prior probabilities indicating probabilities that each of the events is selected, to calculate posterior probabilities that are occurrence probabilities which are obtained for the events and which correspond to a set of feeling expressions accepted by the accepting unit 11. The events, as which, for example, processing modes or coefficient types for image processing performed by the processor 14 may be used, are determined in advance. The likelihoods and the prior probabilities are given for the events in advance. The detail will be described below.

The coefficient setting unit 13 sets coefficients for image processing that is to be performed by the processor 14, from the posterior probabilities calculated by the posterior-probability calculation unit 12. For example, in the case where the events are the processing modes, the coefficient setting unit 13 may select a processing mode on the basis of the posterior probabilities, and may set coefficients for image processing corresponding the selected processing mode. Alternatively, from the posterior probabilities and the coefficients for image processing corresponding to the processing modes, the coefficient setting unit 13 may distribute weights to the processing modes, for example, on the basis of the posterior probabilities, and may perform weighted calculation on the coefficients for image processing corresponding to the processing modes. For example, in the case where the events are the coefficient types for image processing, the coefficient setting unit 13 may use the posterior probabilities to set coefficients for image processing that is to be performed by the processor 14. An example of setting coefficients will be described below.

The processor 14 processes a given image in accordance with the coefficients for image processing which have been set by the coefficient setting unit 13. Processing performed by the processor 14 may include frequency processing or color processing on an image, and image processing for texture control, such as frequency intensity adjustment or color correction, may be performed. The processor 14 processes an image on the basis of the coefficients for image processing which have been set in accordance with the set of feeling expressions selected by a user on the basis of the intention of processing the image, and the resulting image is to be one on which the user's intention is reflected. In other words, when a user simply selects feeling expressions, an intended image is obtained.

Figure 2:
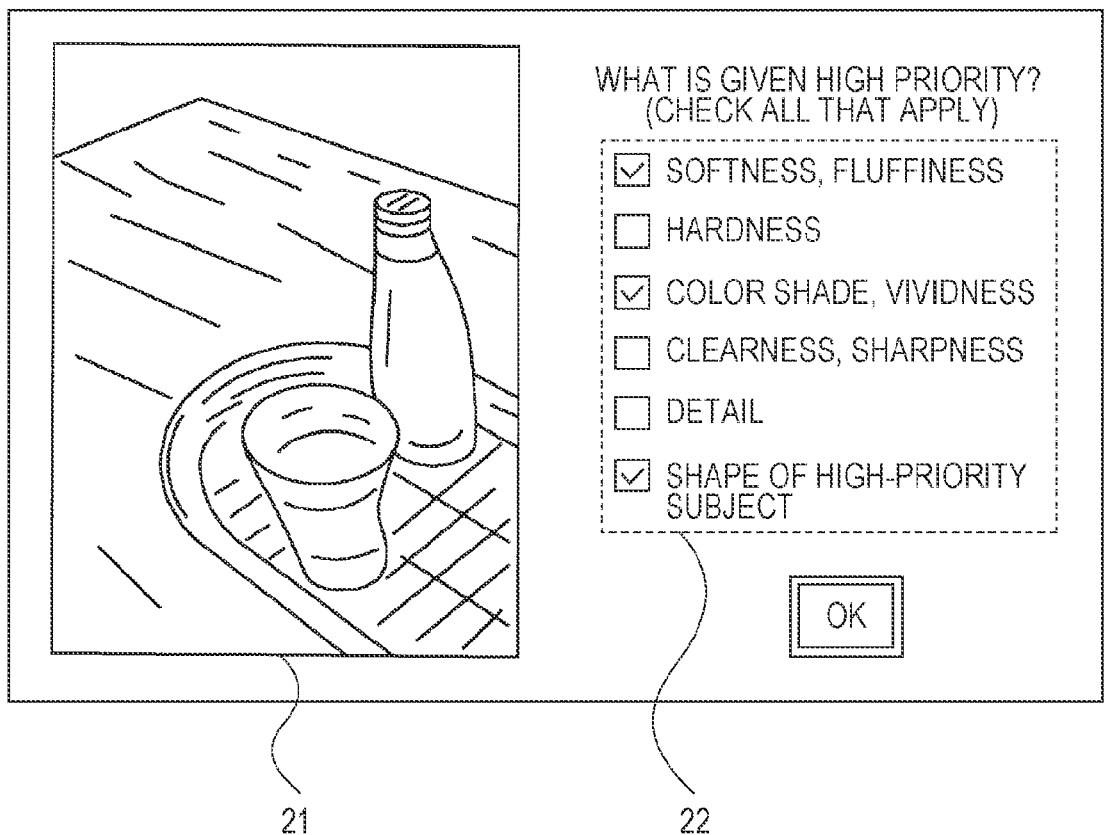
FIG. 2 is a diagram for describing an exemplary screen for presenting feeling expressions to a user.

The above-described configuration will be further described by taking an example. The case where the events are the processing modes will be described as an example. A user selects feeling expressions, and the accepting unit 11 accepts the set of feeling expressions. FIG. 2 is a diagram for describing an exemplary screen for presenting feeling expressions to the user. FIG. 2 illustrates an image display area 21 and a feeling-expression-list display area 22. In the example illustrated in FIG. 2, an image to be processed is displayed in the image display area 21, and a list of feeling expressions representing what is to be given high priority in the process in this example for the image is displayed in the feeling-expression-list display area 22. The user may freely select high-priority ones from the feeling expressions displayed in the feeling-expression-list display area 22. To select feeling expressions, checkboxes may be checked in this example. The number of selections may be one or more than one. In this example, the feeling expressions of "softness, fluffiness", "color shade, vividness", and "shape of high-priority subject" are selected. The selected feeling expressions show a user's intention.

Needless to say, feeling expressions are not limited to those in this example, and the number of feeling expressions is not limited to that in this example. In addition, the display form is not limited to the example illustrated in FIG. 2, and various display forms may be employed.

When the accepting unit 11 accepts the selection of feeling expressions performed by the user, the accepting unit 11 transmits information indicating the set of selected feeling expressions to the posterior-probability calculation unit 12. FIG. 3 is a diagram for describing exemplary information indicating a set of feeling expressions. An example of information about a set of feeling expressions may be represented as a flag sequence indicating whether or not each of the feeling expressions is selected. In the example illustrated in FIG. 3, the flags corresponding to the selected feeling expressions, "softness, fluffiness", "color shade, vividness", and "shape of high-priority subject", are set to "1", and the flags corresponding to the other feeling expressions are set to "0". The flag sequence is transmitted to the posterior-probability calculation unit 12 as information indicating a set of feeling expressions. Needless to say, information indicating a set of feeling expressions is not limited to that in this example. For example, information indicating a set of feeling expressions may be transmitted in various forms, such as a sequence of information corresponding to selected feeling expressions.

Receiving the information indicating a set of feeling expressions from the accepting unit 11, the posterior-probability calculation unit 12 calculates posterior probabilities, for each of the predetermined events, each indicating a probability of occurrence of the event under the condition that the set of feeling expressions is given. When posterior probabilities are to be calculated, likelihoods indicating probabilities that each of the feeling expressions is selected for a selected event, and prior probabilities indicating probabilities that each of the events is selected, are used. In this example, the events are the processing modes. From the likelihoods which are set for each of the processing modes and which correspond to the feeling expressions, and the prior probabilities which are choice probabilities obtained in the state in which no feeling expressions are given for each of the processing modes, the posterior-probability calculation unit 12 calculates posterior probabilities indicating probabilities that each of the processing modes is selected under the condition that the set of feeling expressions is given.

The posterior-probability calculation unit 12 statistically estimates the relationship between feeling expressions and processing modes, and obtains the relationship in advance as likelihoods and prior probabilities. In this example, feeling expressions and processing modes described below are used. FIG. 4 is a diagram for describing an example of feeling expressions and processing modes. The table on the upper side of FIG. 4 contains the feeling expressions illustrated in FIGS. 2 and 3. For convenience of description, the first to sixth feeling expressions are represented by D1 to D6, respectively. Three processing modes, "priority on balance of shape and texture", "priority on color shade and saturation texture", and "priority on high resolution texture", are illustrated in this example. For convenience of description, the first to third processing modes are represented by H1 to H3, respectively. Needless to say, the feeling expressions and the processing modes are merely an example. The feeling expressions and the processing modes are not limited to this, and the number of feeling expressions and the number of the processing modes may be determined during designing.

Using the feeling expressions and the processing modes, an experiment with test subjects is performed. In the experiment, various images, such as goods images of, for example, a metal, glass, clothes, a stuffed toy, and a small article, and natural landscape images, are presented to each test subject, and images which have been processed in the respective processing modes are also presented to the test subject, and the test subject selects the processing mode in which the most desirable image among the presented images has been processed. Then the test subject selects at least one reason why the processing mode is selected, from feeling expressions which indicate "why", "what is given high priority", or the like. Such an experiment is performed with a certain number of test subjects to obtain data.

Data obtained through the above-described experiment is used to obtain a probability of selecting a selected processing mode, from, for example, the data for the processing mode. The obtained probabilities may be used as prior probabilities. Probabilities that the feeling expressions are selected under the condition that each of the processing modes is selected are obtained from the data for the feeling expressions which are answers why the processing mode is selected. Such probabilities are used as likelihoods.

FIGS. 5A and 5B are diagrams for describing an example of the likelihoods and the prior probabilities. FIG. 5A illustrates an example of likelihoods. For example, when the processing mode is H1, the probability of selecting the feeling expression D1 is 0.5; the feeling expression D3, 0.4; the feeling expression D5, 0.2; and so on. In addition, for example, when the processing mode is H3, the probability of selecting the feeling expression D1 is 0.2; the feeling expression D3, 0.3; the feeling expression D5, 0.9; and so on.

FIG. 5B illustrates an example of prior probabilities. For example, the probability of selecting the processing mode H1 is 0.3; the processing mode H2, 0.3; and the processing mode H3, 0.4. The total of the prior probabilities is equal to 1 because any one of the processing modes is selected.

The likelihoods and the prior probabilities illustrated in FIGS. 5A and 5B are merely an example. For example, any values obtained from the above-described experiment may be used. Alternatively, values obtained from the experiment may be processed to be used. Instead, these values may be set by a designer.

The posterior-probability calculation unit 12 uses the likelihoods and the prior probabilities to calculate posterior probabilities. An example of this process will be described. The posterior-probability calculation unit 12 calculates an estimated probability that a certain processing mode is selected, as a combined likelihood for the set of feeling expressions accepted by the accepting unit 11 from a user.

For example, a user selects the feeling expressions D1, D4, and D5. The accepting unit 11 accepts them and transmits, for example, a flag sequence of 100110, as information about the set of feeling expressions to the posterior-probability calculation unit 12.

A probability of selecting the feeling expression D1 under the condition that the processing mode H1 is selected is represented by $P(D1|H1)$; the feeling expression D4, by $P(D4|H1)$; and the feeling expression D5, by $P(D5|H1)$. In the exemplary likelihoods illustrated in FIG. 5A, $P(D1|H1)$ is equal to 0.5; $P(D4|H1)$, 0.4; and $P(D5|H1)$, 0.2. A combined likelihood is obtained by multiplying these values. A probability of selecting the feeling expressions D1, D4, and D5 under the condition that the processing mode H1 is selected is obtained through the following expression.

$$P(D1|H1) \cdot P(D4|H1) \cdot P(D5|H1) \quad \text{Expression 1}$$

A probability of selecting the feeling expressions D1, D4, and D5 under the condition that the processing mode H2 is selected is obtained through the following expression.

$$P(D1|H2) \cdot P(D4|H2) \cdot P(D5|H2) \quad \text{Expression 2}$$

A probability of selecting the feeling expressions D1, D4, and D5 under the condition that the processing mode H3 is selected is obtained through the following expression.

$$P(D1|H3) \cdot P(D4|H3) \cdot P(D5|H3) \quad \text{Expression 3}$$

The values obtained through Expressions 1 to 3 are combined likelihoods for the feeling expressions which correspond to the processing modes H1, H2, and H3.

The posterior-probability calculation unit 12 calculates posterior probabilities on the basis of the combined likelihoods thus calculated and the prior probabilities illustrated in FIG. 5B. The posterior probabilities may be calculated, for example, by using Bayes theorem. The prior probabilities for the processing modes H1, H2, and H3 illustrated in FIG. 5B are represented by $P(H1)$, $P(H2)$, and $P(H3)$, respectively.

The posterior probabilities $P(H1|D1, D4, D5)$, $P(H2|D1, D4, D5)$, and $P(H3|D1, D4, D5)$ that it is determined that the processing modes H1, H2, and H3, respectively, are desirable from the set of feeling expressions selected by a user are calculated through the following expressions.

$$P(H1|D1,D4,D5) \propto P(D1|H1) \cdot P(D4|H1) \cdot P(D5|H1) \cdot P(H1) \quad \text{Expression 4}$$

$$P(H2|D1,D4,D5) \propto P(D1|H2) \cdot P(D4|H2) \cdot P(D5|H2) \cdot P(H2) \quad \text{Expression 5}$$

$$P(H3|D1,D4,D5) \propto P(D1|H3) \cdot P(D4|H3) \cdot P(D5|H3) \cdot P(H3) \quad \text{Expression 6}$$

Here, $\propto$ indicates the proportional relationship. A probability which occurs for all of the feeling expressions is present as a common term in the denominator of Expressions 4 to 6. Since it is not necessary to calculate it when the magnitudes of the values obtained through Expressions 4 to 6 are compared, the calculation is skipped, and the proportionality sign is used.

When calculation is performed in accordance with the prior probabilities illustrated in FIG. 5B through Expressions 4 to 6, the following expressions are obtained.

$$P(H1|D1,D4,D5) \propto 0.012$$

$$P(H2|D1,D4,D5) \propto 0.0144$$

$$P(H3|D1,D4,D5) \propto 0.0432$$

Here, the calculated values are substituted for the posterior probabilities. Needless to say, the value of the common term may be calculated. The posterior probabilities may indicate a probability that the user intends to use the processing mode H1 through the accepted set of feeling expressions, a probability that the user intends to use the processing mode H2, and a probability that the user intends to use the processing mode H3.

The coefficient setting unit 13 sets coefficients for image processing that is to be performed by the processor 14, from the posterior probabilities calculated by the posterior-probability calculation unit 12. In this example, the coefficient setting unit 13 selects any one of the processing modes on the basis of the posterior probabilities for the respective processing modes, and sets coefficients for image processing which correspond to the selected processing mode. Using the above-described example, the magnitudes of the posterior probabilities are compared with each other, whereby the following expression is obtained.

$$P(H3|D1,D4,D5) > P(H2|D1,D4,D5) > P(H1|D1,D4,D5) \quad \text{Expression 7}$$

Therefore, when a user selects a combination of the feeling expressions D1, D4, and D5, it is statistically estimated that the user intends to perform processing using the processing mode H3. Accordingly, the coefficient setting unit 13 outputs the coefficients for image processing which correspond to the processing mode H3.

FIG. 6 is a diagram for describing an example of the processing modes and coefficients for image processing. Each of the processing modes is associated with coefficients for controlling image processing performed by the processor 14. For example, in the example illustrated in FIG. 6, coefficients, the number of which is equal to n, are set. The processing mode H1 is associated with coefficients $t_{11}$ to $t_{1n}$; the processing mode H2, coefficients $t_{21}$ to $t_{2n}$; and the processing mode H3, coefficients $t_{31}$ to $t_{3n}$. In the case where the processor 14 performs a saturation emphasis process and a band emphasis process, these coefficients include coefficients for the saturation emphasis process, coefficients indicating a band on which the band emphasis process is performed, and coefficients for frequency emphasis. As these coefficients for image processing, coefficients corresponding to the processing performed by the processor 14 are associated with each of the processing modes.

The processor 14 performs various types of processing on a given image that is to be processed, in accordance with the coefficients for image processing which have been set by the coefficient setting unit 13. For example, the various types of processing may include processes for controlling texture, such as the saturation emphasis process and the band emphasis process described above. Needless to say, the various types of processing are not limited to these processes.

As described above, image processing is performed by using the coefficients for image processing which correspond to the processing mode obtained through the statistical estimation from a set of feeling expressions selected by a user. Therefore, the image obtained through the processing is to be an image on which the user's intention is statistically reflected. To obtain this processing result, a user simply selects feeling expressions.

In the foregoing description, the example in which the coefficient setting unit 13 selects any one of the processing modes on the basis of the posterior probabilities for the respective processing modes is described. Alternatively, the coefficient setting unit 13 may distribute weights to the processing modes, for example, on the basis of the posterior probabilities, and may perform weighted calculation on coefficients for image processing. An example of this case will be described.

The coefficient setting unit 13 performs weighted calculation on coefficients for image processing which are prepared for each of the processing modes, by using the posterior probabilities calculated by the posterior-probability calculation unit 12. FIG. 7 is a diagram for describing an example of weights, the processing modes, and the coefficients for image processing. In this example, using the example of the processing modes and the coefficients for image processing illustrated in FIG. 6, the processing modes H1, H2, and H3 are associated with weights $w_1$, $w_2$, and $w_3$, respectively. The weights $w_1$, $w_2$, and $w_3$ may be the posterior probabilities themselves for the processing modes, or may be values calculated from the posterior probabilities. For example, the weights may be values obtained through normalization of the posterior probabilities, or may be values obtained by using a predetermined function.

Coefficients $T_j$ (j=1, ..., n), the number of which is equal to n, for image processing after weighted calculation are obtained through the following expression by using the three weights $w_i$ (i=1, 2, and 3) for the processing modes and the coefficients $t_{ij}$ (j=1, ..., n), the number of which is equal to n, for image processing which correspond to each of the processing modes, as illustrated in FIG. 7.

$$T_j = \left(\sum_{i=1}^{3} w_i t_{ij}\right) / \left(\sum_{i=1}^{3} w_i\right) \quad \text{Expression 8}$$

Thus, coefficients ($T_1$, $T_2$, ..., $T_n$), the number of which is equal to n, for image processing are obtained. Needless to say, the way of weighted calculation is not limited to this example. For example, weighted calculation may be performed by using a difference between each of the coefficients for image processing and a basic value. Thus, modification may be made to the type of weights to be used, as well as to a target on which weighting using the weights are performed, as long as coefficients for image processing may be set through weighted calculation based on the posterior probabilities.

The obtained coefficients for image processing after weighted calculation may be set to the processor 14, and various types of processing may be performed on a given image that is to be processed, in accordance with the coefficients for image processing which have been set in the processor 14. In the case where the coefficients for image processing are set through weighted calculation, composite processing result is also obtained from some of the processing modes instead of any one of the processing modes. For example, in the case where the difference between the posterior probability for one of the processing modes and that for another is small, a processing result desirable to a user is obtained compared with the case where any one of the processing modes is selected.

In the foregoing description, the example is described in which the events are the processing modes. In the example, the posterior-probability calculation unit 12 calculates the posterior probabilities for the respective processing modes, and the coefficient setting unit 13 sets coefficients for image processing from the posterior probabilities for the processing modes. Then, the processor 14 performs image processing. However, the events are not limited to the processing modes, and, for example, the events may be coefficients themselves for image processing.

In this case, the likelihoods illustrated in FIG. 5A represent relationship between the feeling expressions and the coefficients for image processing. The prior probabilities indicate statistics with which each of the coefficients for image processing is used. The likelihoods and the prior probabilities may be predetermined. For example, they may be determined through an experiment, or values may be given. By using the likelihoods obtained by associating the feeling expressions with the coefficients for image processing, and by using the prior probabilities for the respective coefficients for image processing, the posterior-probability calculation unit 12 calculates the posterior probabilities for the coefficients for image processing from a set of feeling expressions accepted by the accepting unit 11. Then, the coefficient setting unit 13 performs weighting on the coefficients for image processing by using the posterior probabilities as weights, and sets the coefficients for image processing after weighted calculation. For example, a coefficient for image processing is represented by $t_i$, and a weight obtained from a posterior probability is represented by $w_i$. A coefficient $T_i$ for image processing after weighted calculation is basically calculated through the following expression.

$$T_i = w_i \cdot t_i$$

Needless to say, how to set a weight $w_i$ and how to perform weighted calculation are not limited to this example, and the methods may be determined in advance. The processor 14 may perform image processing on a given image that is to be processed, in accordance with the coefficients for image processing which have been set.

Figure 8:
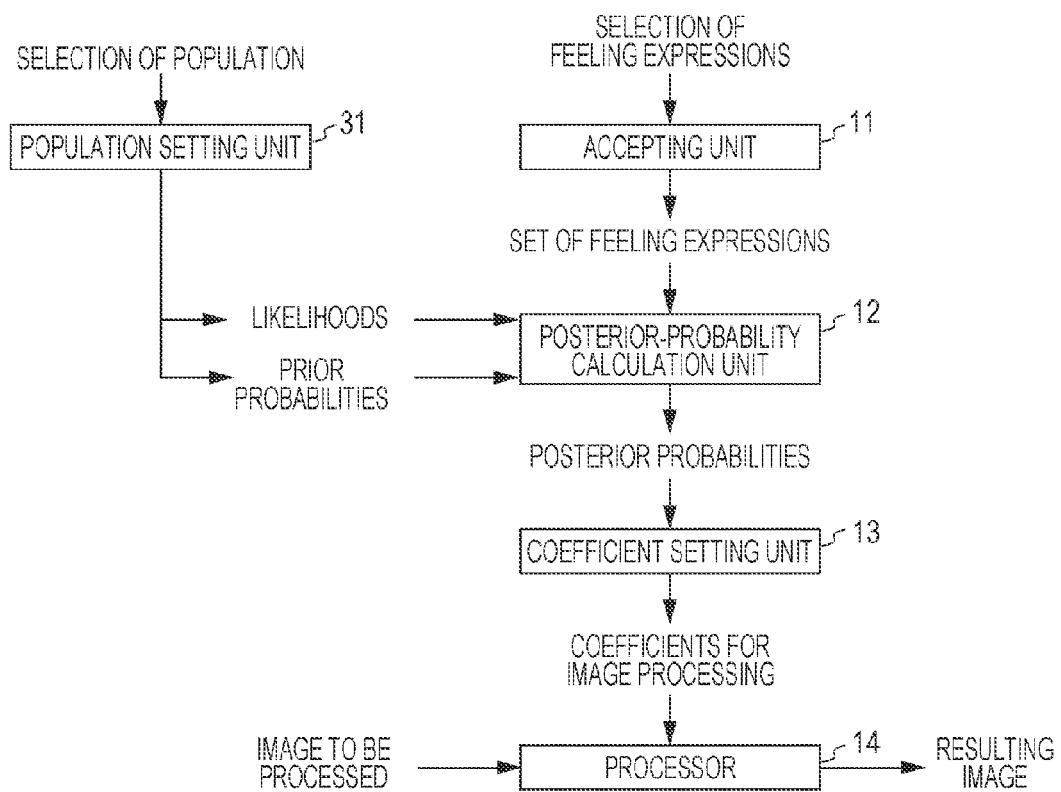
FIG. 8 is a diagram illustrating a configuration of a second exemplary embodiment of the present intention.

FIG. 8 is a diagram illustrating a configuration of a second exemplary embodiment of the present intention. FIG. 8 illustrates a population setting unit 31. The difference between the above-described first exemplary embodiment and the second exemplary embodiment will be mainly described. As described in the first exemplary embodiment, for example, values obtained through an experiment or values calculated on the basis of the values obtained through the experiment may be used as the likelihoods and the prior probabilities. In this case, different values may be obtained depending on test subjects for the experiment. For example, the sense to an image may vary depending on the generation, the gender, the area, the environment, or the like of a test subject, or differences may occur depending on what test subjects think is the usage of an image. One solution is that a population is configured in such a manner that such bias does not occur. Alternatively, statistical information obtained from populations having characteristics to some degree may be used. In the second exemplary embodiment, a configuration is used in which the likelihoods and the prior probabilities are obtained for some populations, and in which the likelihoods and the prior probabilities are used by switching the population.

The population setting unit 31 accepts the setting for population. The posterior-probability calculation unit 12 uses the likelihoods and the prior probabilities which correspond to the population which is set by the population setting unit 31, to calculate posterior probabilities from a set of feeling expressions accepted by the accepting unit 11.

Figure 9:
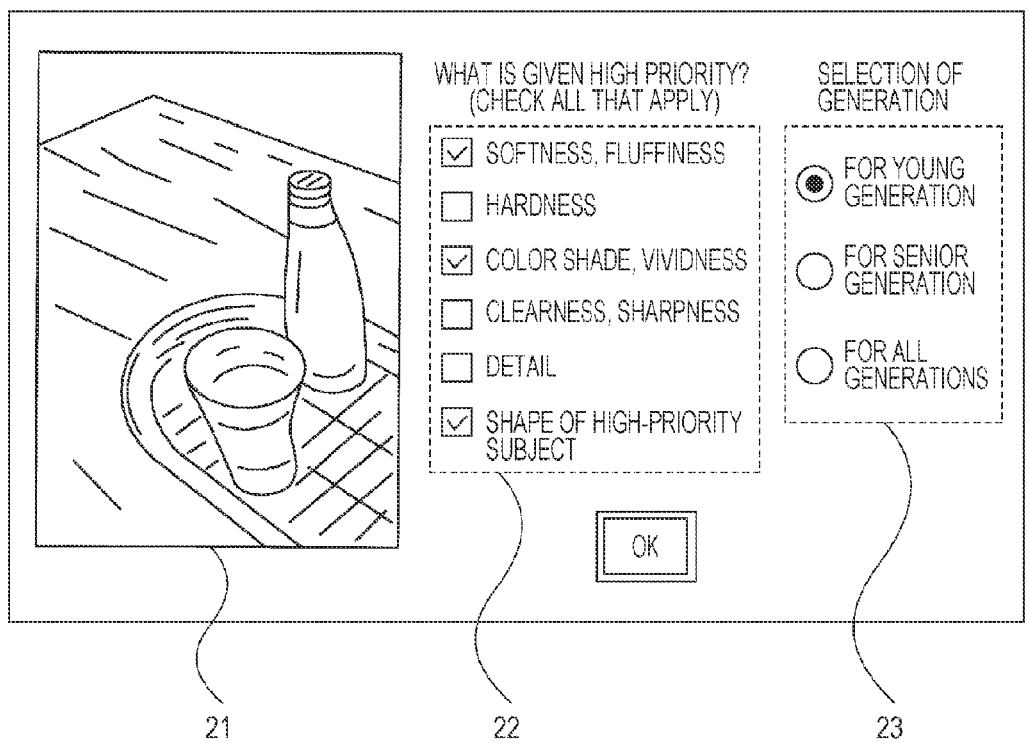
FIG. 9 is a diagram for describing an exemplary screen on which a user selects feeling expressions and a population.

FIG. 9 is a diagram for describing an exemplary screen on which a user selects feeling expressions and a population. FIG. 9 illustrates a population display area 23. In the example illustrated in FIG. 9, an image is displayed in the image display area 21, and a list of feeling expressions is displayed in the feeling-expression-list display area 22, as in the example illustrated in FIG. 2. In addition, a list of classifications for population is displayed in the population display area 23. In this example, population is classified on the basis of the generation. A population is selected from three populations of "for young generation", "for senior generation", and "for all generations". A user may select one of the population items listed in the population display area 23.

The population setting unit 31 accepts the selection of a population performed by the user, and switches the likelihoods and the prior probabilities used by the posterior-probability calculation unit 12. FIGS. 10A and 10B are diagrams for describing an example of sets of likelihoods and sets of prior probabilities prepared for respective populations. The likelihoods and the prior probabilities illustrated in FIGS. 10A and 10B correspond to the example illustrated in FIG. 5. Three sets of likelihoods and prior probabilities are prepared for three populations of "for young generation", "for senior generation", and "for all generations". The population setting unit 31 selects a set of likelihoods and prior probabilities which corresponds to the population selected by the user, from these sets. The posterior-probability calculation unit 12 uses the selected set of likelihoods and prior probabilities to calculate posterior probabilities. Needless to say, as described in the first exemplary embodiment, the events used when the likelihoods and the prior probabilities are obtained may be the processing modes or coefficient types for image processing. In addition, how to calculate posterior probabilities, how to set coefficients for image processing from the posterior probabilities, and the like are described in the first exemplary embodiment.

Thus, the coefficient setting unit 13 uses the posterior probabilities calculated by the posterior-probability calculation unit 12 on the basis of the likelihoods and the prior probabilities obtained on the basis of the selected population, to set coefficients for image processing. The processor 14 uses the coefficients for image processing which have been set by the coefficient setting unit 13, to process a given image.

For example, when a user selects a population to which the user belongs, an image subjected to processing suitable for the user is obtained compared with a result obtained through general processing. In addition, when an image is to be presented to another population, a resulting image subjected to processing suitable for the target generation is obtained.

In the example illustrated in FIGS. 9, 10A, and 10B, the classifications for population are "for young generation", "for senior generation", and "for all generations". Needless to say, the classifications for population are not limited to these. In the case where change in statistical population causes its characteristic to change, the population setting unit 31 has setting describing which characteristic, according to which processing is performed, is to be used. As long as the classification is not one destroying the essence of the population, such as the gender, the area, the environment, or the usage described above, the population may be classified in any manner. The number of populations and the words representing the populations are not limited to the illustrated example. The display form is not limited to the example illustrated in FIG. 9, and various display forms may be employed.

Figure 11:
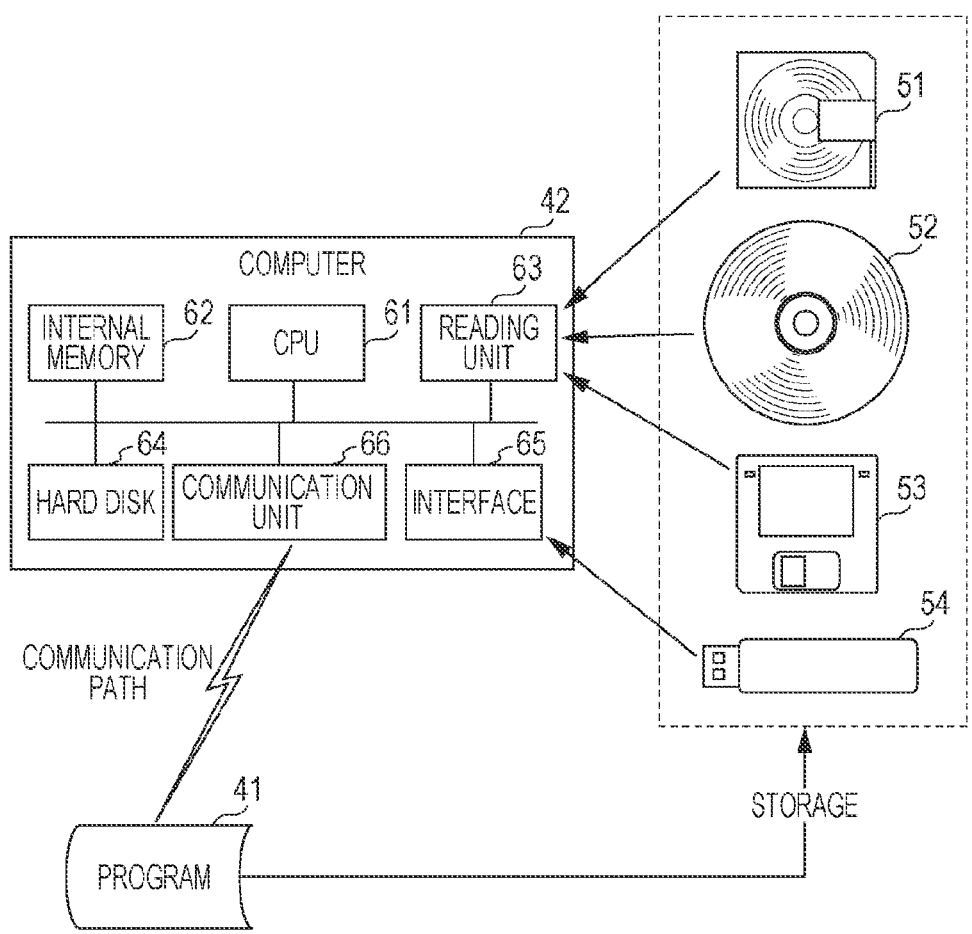
FIG. 11 is a diagram for describing an example of a computer program, storage media storing the computer program, and a computer which are used when functions described in the exemplary embodiments of the present invention are achieved by using the computer program.

FIG. 11 is a diagram for describing an example of a computer program, storage media storing the computer program, and a computer which are used when functions described in the exemplary embodiments of the present invention are achieved by using the computer program. FIG. 11 illustrates a program 41, a computer 42, a magneto-optical disk 51, an optical disk 52, a magnetic disk 53, a memory 54, a central processing unit (CPU) 61, an internal memory 62, a reading unit 63, a hard disk 64, an interface 65, and a communication unit 66.

Some or all of the functions of the units described above as the exemplary embodiments of the present invention may be achieved by using the program 41 executed by a computer. In this case, the program 41 and data used by the program 41 may be stored in a storage medium accessed by a computer. A storage medium operates in such a manner that change in energy of magnetism, light, electricity, or the like is caused on the reading unit 63 provided as hardware resource of a computer, in accordance with the description in a program, and that the description in the program is transmitted to the reading unit 63 in a corresponding signal format. Examples of a storage medium include the magneto-optical disk 51, the optical disks 52 including a compact disk (CD) and a digital versatile disk (DVD), the magnetic disk 53, and the memories 54 including an integrated circuit (IC) card, a memory card, and a flash memory. Needless to say, these storage media are not limited to portable media.

The program 41 is stored in such a storage medium, and the storage medium is attached to, for example, the reading unit 63 or the interface 65 of the computer 42. The program 41 is read out from the computer 42 so as to be stored in the internal memory 62 or the hard disk 64, such as a magnetic disk or a silicon disk, and the CPU 61 executes the program 41, whereby some or all of the functions described above as the exemplary embodiments of the present invention are achieved. Alternatively, some or all of the functions may be achieved as follows. The program 41 is transferred to the computer 42 via a communication path. The computer 42 receives the program 41 through the communication unit 66, and stores it in the internal memory 62 or the hard disk 64. The CPU 61 executes the program 41.

Various other apparatuses may be connected to the computer 42 via the interface 65. For example, a display unit which displays information may be connected to the computer 42, and may display feeling expression choices and, in addition, population choices. Further, an accepting unit which accepts information from a user may be connected to the computer 42, and a user may select feeling expressions and, in addition, a population. Needless to say, other apparatuses may be connected to the computer 42. The configurations do not need to operate on one computer, and another computer may perform processing in accordance with a processing stage.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    an accepting unit that accepts a set of feeling expressions representing texture factors;
    a calculation unit that calculates posterior probabilities which are event probabilities for events by using likelihoods and prior probabilities, the event probabilities corresponding to the set of feeling expressions, the likelihoods indicating probabilities that each of the feeling expressions is selected for an event selected from the events, the prior probabilities indicating probabilities that each of the events is selected;
    a coefficient setting unit that sets coefficients for image processing from the posterior probabilities; and
    a processor that performs processing on a given image in accordance with the coefficients which have been set.

2. The image processing apparatus according to claim 1, wherein the events are processing modes for an image, and wherein the coefficient setting unit specifies any one of the processing modes from the posterior probabilities for the processing modes, and sets coefficients for image processing corresponding to the specified processing mode.

3. The image processing apparatus according to claim 1, wherein the events are processing modes for an image, and wherein the coefficient setting unit performs weighted calculation to obtain coefficients for image processing by using the posterior probabilities for the respective processing modes.

4. The image processing apparatus according to claim 3, wherein the coefficient setting unit distributes weights to the respective processing modes on the basis of the posterior probabilities, and obtains sums through weighting using the weights and coefficient sets for image processing in the respective processing modes so as to calculate the coefficients for image processing.

5. The image processing apparatus according to claim 1, wherein the events are coefficient types for image processing, and wherein the coefficient setting unit uses posterior probabilities for the respective coefficient types for image processing to set coefficients for image processing.

6. The image processing apparatus according to claim 1, further comprising:
    a population setting unit that accepts setting of a population,
    wherein the calculation unit uses likelihoods and prior probabilities for the population which has been set, to calculate the posterior probabilities.

7. The image processing apparatus according to claim 2, further comprising:
    a population setting unit that accepts setting of a population,
    wherein the calculation unit uses likelihoods and prior probabilities for the population which has been set, to calculate the posterior probabilities.

8. The image processing apparatus according to claim 3, further comprising:
    a population setting unit that accepts setting of a population,
    wherein the calculation unit uses likelihoods and prior probabilities for the population which has been set, to calculate the posterior probabilities.

9. The image processing apparatus according to claim 4, further comprising:
    a population setting unit that accepts setting of a population,
    wherein the calculation unit uses likelihoods and prior probabilities for the population which has been set, to calculate the posterior probabilities.

10. The image processing apparatus according to claim 5, further comprising:
    a population setting unit that accepts setting of a population,
    wherein the calculation unit uses likelihoods and prior probabilities for the population which has been set, to calculate the posterior probabilities.

11. The image processing apparatus according to claim 1, wherein each of the feeling expressions is constituted by an adjective, an adverb, a noun, or text using these representing a reproduction purpose or a characteristic of a scene or a target in an image.

12. The image processing apparatus according to claim 1, wherein the processor performs processing including at least one of frequency processing and color processing on an image.

13. A non-transitory computer readable medium storing an image processing program causing a computer to execute a function of the image processing apparatus according to claim 1.

14. An image processing method comprising:
    accepting a set of feeling expressions representing texture factors;
    calculating posterior probabilities which are event probabilities for events by using likelihoods and prior probabilities, the event probabilities corresponding to the set of feeling expressions, the likelihoods indicating probabilities that each of the feeling expressions is selected for an event selected from the events, the prior probabilities indicating probabilities that each of the events is selected;
    setting coefficients for image processing from the posterior probabilities; and
    performing processing on a given image in accordance with the coefficients which have been set.

* * * * *